(12) United States Patent
Yu

(10) Patent No.: US 7,440,266 B2
(45) Date of Patent: Oct. 21, 2008

(54) PORTABLE ELECTRONIC DEVICE

(75) Inventor: Christine Yu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/655,902

(22) Filed: Jan. 22, 2007

(65) Prior Publication Data

US 2008/0176603 A1 Jul. 24, 2008

(51) Int. Cl.
*G06F 1/16* (2006.01)
(52) U.S. Cl. .................... 361/681; 361/683; 455/556.1; 455/556.2
(58) Field of Classification Search ......... 361/679–683; 312/223.1, 223.2; 455/556.1, 556.2
See application file for complete search history.

(56) References Cited

U.S. PATENT DOCUMENTS

| 6,233,138 | B1 * | 5/2001 | Osgood | 361/681 |
|---|---|---|---|---|
| 6,262,885 | B1 * | 7/2001 | Emma et al. | 361/683 |
| 6,462,938 | B1 * | 10/2002 | Horne et al. | 361/681 |
| 6,532,147 | B1 * | 3/2003 | Christ, Jr. | 361/683 |
| 6,542,721 | B2 * | 4/2003 | Boesen | 455/553.1 |
| 6,655,646 | B2 * | 12/2003 | Johnson | 248/285.1 |
| 6,757,551 | B2 * | 6/2004 | Newman et al. | 455/556.1 |
| 6,788,529 | B2 * | 9/2004 | Homer et al. | 361/683 |
| 6,892,082 | B2 * | 5/2005 | Boesen | 455/575.3 |
| 7,107,084 | B2 * | 9/2006 | Duarte et al. | 455/575.3 |
| 2006/0104012 | A1 * | 5/2006 | Hsieh et al. | 361/679 |

* cited by examiner

*Primary Examiner*—Jayprakash N Gandhi
*Assistant Examiner*—Anthony Q Edwards
(74) *Attorney, Agent, or Firm*—Bacon & Thomas, PLLC

(57) ABSTRACT

The present invention discloses a portable electronic device including a main body, a recess at an end of the main body for containing at least one first display module, and at least one connecting member between the recess and the first display module. An end of the connecting member is pivotally connected to the recess and another end of the connecting member is pivotally connected to the first display module, such that the first display module with the connecting member can be stored into the recess or turned out from the recess to a position parallel and next to an end of the main body.

4 Claims, 4 Drawing Sheets

PORTABLE ELECTRONIC DEVICE

FIELD OF THE INVENTION

The present invention relates to a portable electronic device and more particularly to a portable electronic device having a display module which can be stored in a recess of a main body or turned out to a position parallel and next to the main body.

BACKGROUND OF THE INVENTION

In a world dominated by information technologies and ever-progressing electronics devices, computer-based hi-tech communication products have become more central to our connected lifestyles. They effectively shorten the distance in time and space between people. Seeing the ubiquity of electronic communication products (e.g. cellular phones, personal digital assistances PDAs and other handheld computers), corporations began offering more incentive programs, making the competition on the market increasingly intense. Major communication product manufacturers continuously introduce newer models to attract potential customers. On the other hand, users have also become more demanding in the quality of those products. The ability to manufacture more convenient and efficient services in communication products has become the international index of technology leadership.

Current electronic communication devices (e.g. cellular phone, PDAs) are evolving toward becoming compact in size and loaded in functions. As its size shrinks, so does the area of its display screen. The most common remedy to this issue is extending the area of the display screen to cover almost a whole side of the communication device. On the other hand, for this type of products to be competitive on the market, the control buttons or keypad must then be hidden inside the electronics communication device by a sliding cover or a flip-open cover, thus considerably increases the cost. Consequently, developing a portable electronic device which provides a bigger display screen while maintaining the cost relatively low by not requiring for a hidden keypad or buttons has become a critical issue for the manufacturers.

SUMMARY OF THE INVENTION

After considerable research and experimentation, a portable electronic device according to the present invention has been developed so as to overcome the drawbacks associated with said prior art.

It is an object of the present invention to provide a portable electronic device which comprises a main body having a recess, the recess can accommodate at least a first display module. The recess connects to the first display module by at least one connecting member having one end pivotally connected to the recess and another end pivotally connected to the first display module, thereby the first display module is driven by movement of the connecting member to be stored into the recess or turned out from the recess to a position parallel and next to an end of the main body.

It is another object of the present invention that a second display module can be accommodated between the recess and the first display module with the second display module being removably engaged in the recess thereby when the first display module is driven toward one end of the portable electronic device, movement of the first display module drives the connecting member to extend and via the connecting member, the first display module is turned out to a position parallel and next to the second display module, effectively combining the first display module and the second display module into a bigger display screen.

It is yet another object of the present invention that a backup power module can be accommodated between the recess and the first display module to facilitate more backup power in the portable electronic device.

BRIEF DESCRIPTION OF THE DRAWINGS

The features, objects and advantages of the invention will become more apparent from the detailed description set forth below when taken in conjunction with the drawings in which like references characters identify correspondingly throughout, and wherein.

DETAILED DESCRIPTION OF THE PREFERRED EMBODIMENTS

Figure 1:
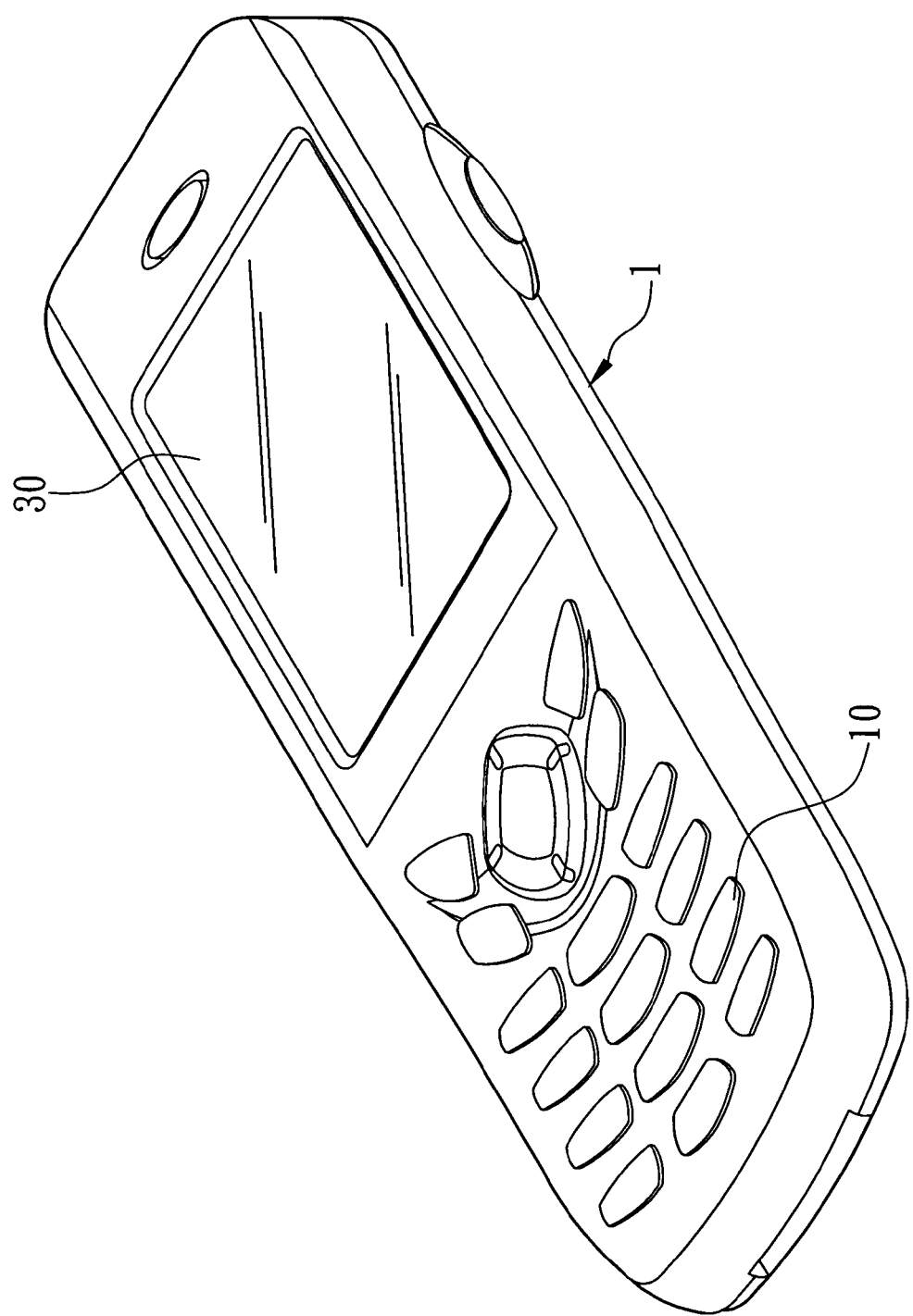
FIG. 1 shows a perspective view of the present invention.
Figure 2:
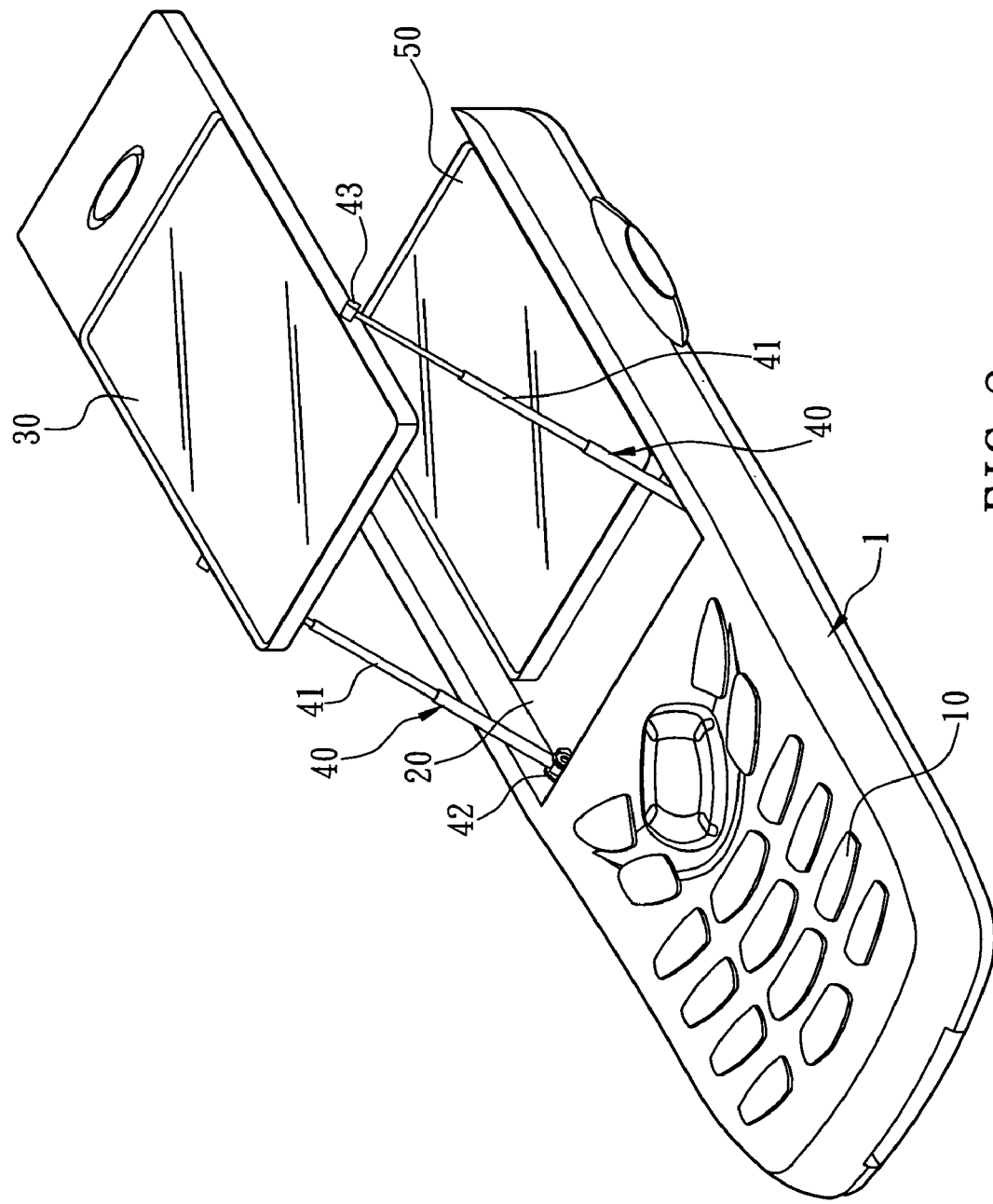
FIG. 2 is a representative diagram of a preferred embodiment according to the present invention.

Refer to FIG. 1 and FIG. 2 for a portable electronic device according to the present invention. The portable electronic device comprises a main body 1, the main body 1 has a recess 20 at one end. The recess 20 can accommodate at least a first display module 30. The recess 20 connects to the first display module 30 by at least one connecting member 40 having one end pivotally connected to the recess 20 and another end pivotally connected to the first display module 30, thereby the first display module 30 is driven by movement of the connecting member 40 to be stored into the recess 20 or turned out from the recess 20 to a position parallel and next to an end of the main body 1.

Figure 3:
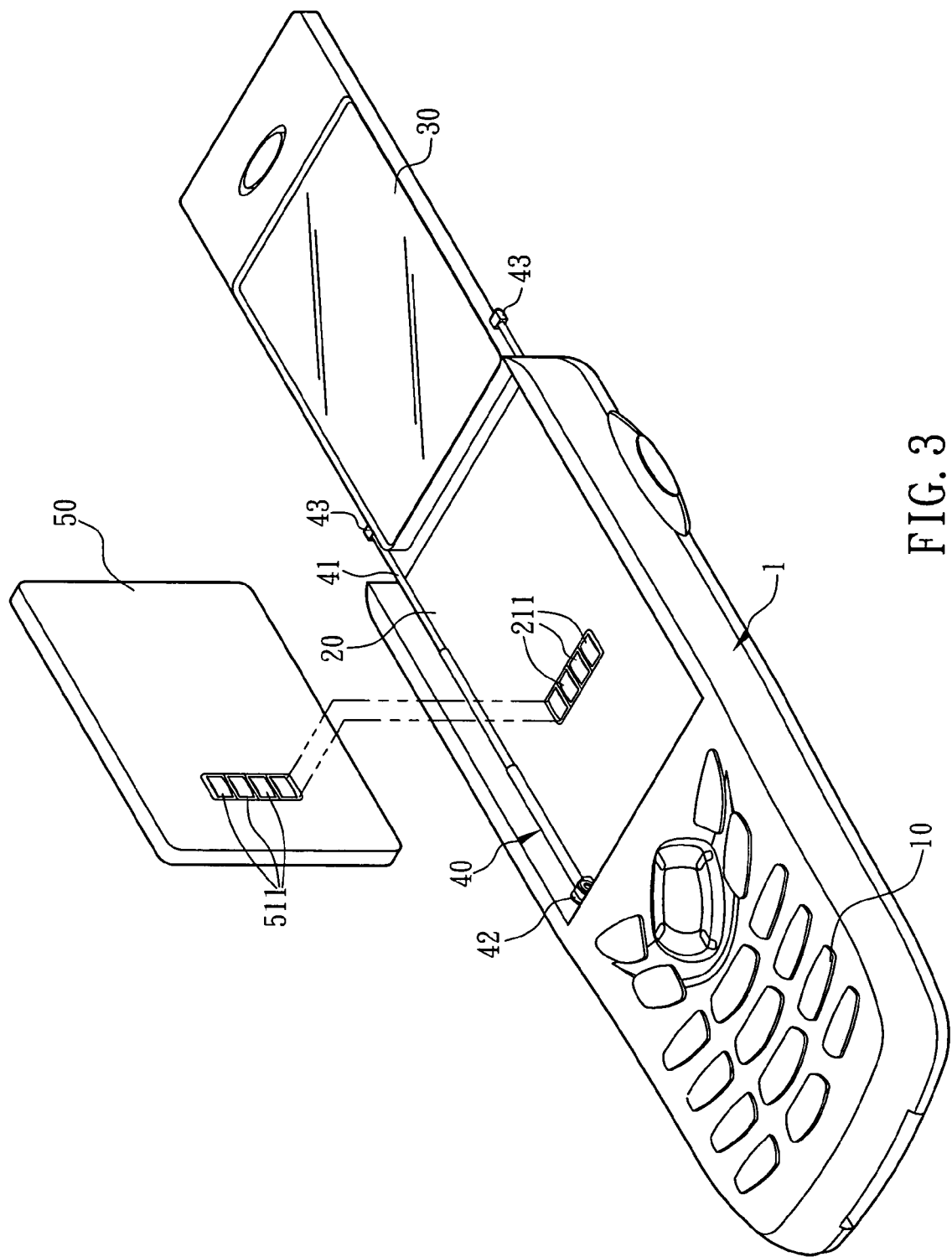
FIG. 3 is an operational diagram of the preferred embodiment according to the present invention.

Refer to FIG. 2 and FIG. 3 for a preferred embodiment according to the present invention. The portable electronic device is a mobile phone in the preferred embodiment. Main body 1 of the mobile phone has a keypad unit 10 at one end; recess 20 locates at the other end of the main body 1. Each of the connecting members 40 comprises an adjustably extendible and retractable cylindrical member 41, a first turning unit 42 and a second turning unit 43. Since the cylindrical member 41 is extendible and retractable, the first display module 30 can be driven away from the recess 20 when the cylindrical member is extended, or the first display module 30 can be driven close to and stored into the recess 20 when the cylindrical member 41 is retracted.

The first turning unit 42 has one end connected to the recess 20 and another end pivotally connected to one end of the cylindrical member 41 so that the first turning unit 42 drives the turning motion of the cylindrical member 41. The second turning unit 43 has one end pivotally connected to the first display module 30 and another end connected to the other end of the cylindrical member 41 so that the second turning unit 43 drives the turning motion of the display module 30. Therefore when the first display module 30 is pushed toward one end of the portable electronic device, movement of the first display module drives 30 the cylindrical member 41 to extend. In response to extending of the cylindrical member 41, the first turning unit 42 drives the cylindrical member 41 to turn away from the side of the main body 1 where the keypad unit 10 locates, and the first display module 30 is then turned out and becomes parallel to the main body 1. Thus completes turning out the display module 30 to a position parallel and next to an end of the main body 1. On the other hand, with the combination of the movement of the display module 30 and the second tuning unit 43, the first tuning unit 42 turns and drives the first display module 30 to move toward the same side of the main body 1 as the keypad unit 10 and face the recess 20. Then the display module 30 can be pushed to drive the retracting of the cylindrical member 41 so that the display module 30 is stored in the recess 20.

Refer to FIG. 2 and FIG. 3 again. An electrically conducting wire runs from the recess 20 via the connecting member 40 to the first display module 30 and electrically connects to first display module 30 for transmitting power and information to be displayed to the first display module 30 The recess 20 further comprises a plurality of first electrical connecting points 211. In addition to the first display module 30, a second display module 50 can be accommodated in the recess 20 between the recess 20 and the first display module 30 with the second display module being removably engaged in the recess 20. The second display module 50 comprises a plurality of second electrical connecting points 511 corresponding to the first electrical connecting points 211, therefore and the second display module 50 can receive power and information transmitted from the first electrical connecting points 211 via the second electrical connecting points 511. When the first display module 30 is turned out to the position parallel and next to the main body 1, the first display module 30 and the second display module 50 are effectively combined to form a bigger display screen.

Figure 4:
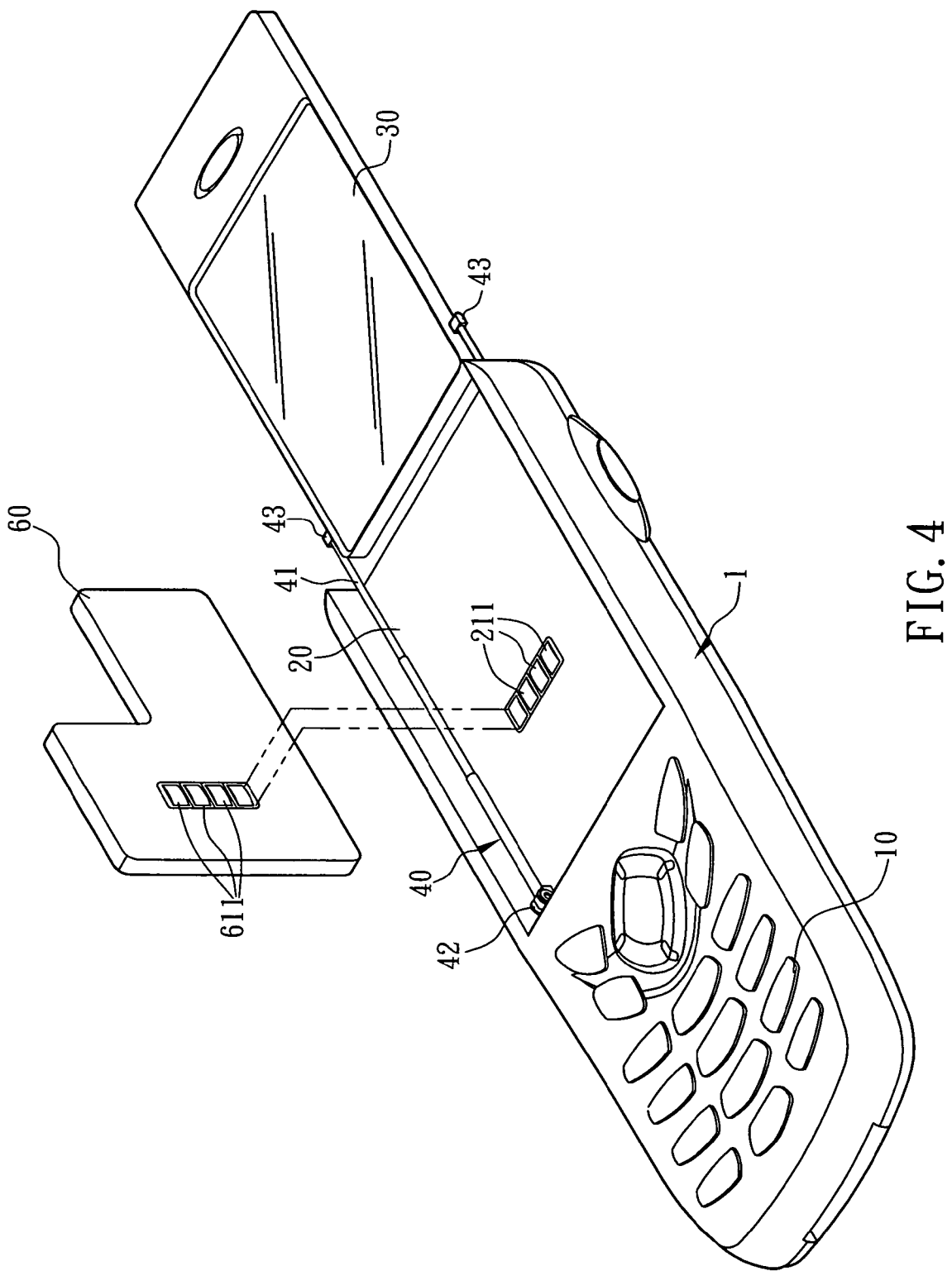
FIG. 4 is an operational diagram of another preferred embodiment according to the present invention.

Refer to FIG. 4 for another preferred embodiment of the present invention. A backup power module 60 can be accommodated between the recess 20 and the first display module 30 with the backup power module 60 being removably engaged in the recess 20. The backup power module comprises a plurality of third electrical connecting points 611 corresponding to the first electrical connecting points 211 so that the backup power module 60 can transmit power via the third electrical connecting points 611 and the first electrical connecting points 211 to the main body 1 to facilitate more backup power in the portable electronic device.

While the invention herein disclosed has been described by means of specific embodiments, numerous modifications and variations could be made thereto by those skilled in the art without departing from the scope and spirit of the invention set forth in the claims.

What is claimed is:

1. A portable electronic device, comprising:
a main body having a recess, the recess having a plurality of first electrical connecting points for transmitting power and information;
at least one connecting member having one end pivotally connected to the recess, wherein the at least one connecting member includes:
an adjustably extendible and retractable cylindrical member, enabling the first display module to be driven away from the recess when the cylindrical member is extended, and to be driven close to and stored into the recess when the cylindrical member is retracted;
a first turning unit having one end connected to the recess and another end pivotally connected to one end of the cylindrical member, for driving the turning motion of the cylindrical member; and
a second turning unit having one end pivotally connected to the first display module and another end connected to the other end of the cylindrical member;
a first display module pivotally connected to the other end of the connecting member, the first display module being driven by movement of the connecting member to be stored into the recess or turned out from the recess to a position parallel and next to an end of the main body;
a wire running from the main body via the at least one connecting member to the first display module for transmitting power and information to the first display module; and
a second display module being accommodated between the recess and the first display module and removably engaged in the recess for receiving the power and information transmitted from the first electrical connecting points;
wherein the second display module comprises a plurality of second electrical connecting points corresponding to the first electrical connecting points and the second display module receives power and information transmitted from the first electrical connecting points via the second electrical connecting points.

2. The portable electronic device of claim 1, wherein the main body comprises a keyboard unit at the end opposite to the recess.

3. A portable electronic device, comprising:
a main body having a recess, the recess having a plurality of first electrical connecting points for transmitting power and information;
at least one connecting member having one end pivotally connected to the recess, wherein the at least one connecting member includes:
an adjustably extendible and retractable cylindrical member, enabling the first display module to be driven away from the recess when the cylindrical member is extended, and to be driven close to and stored into the recess when the cylindrical member is retracted;
a first turning unit having one end connected to the recess and another end pivotally connected to one end of the cylindrical member, for driving the turning motion of the cylindrical member; and
a second turning unit having one end pivotally connected to the first display module and another end connected to the other end of the cylindrical member;
a first display module pivotally connected to the other end of the connecting member, the first display module being driven by movement of the connecting member to be stored into the recess or turned out from the recess to a position parallel and next to an end of the main body;
a wire running from the main body via the at least one connecting member to the first display module for transmitting power and information to the first display module; and
a backup power module being accommodated between the recess and the first display module and removably engaged in the recess for receiving the power and information transmitted from the first electrical connecting points;
wherein the backup power module comprises a plurality of third electrical connecting points corresponding to the first electrical connecting points and the backup power module transmits power via the third electrical connecting points and the first electrical connecting points to the main body.

4. The portable electronic device of claim 3, wherein the main body comprises a keyboard unit at the end opposite to the recess.

* * * * *